UNITED STATES PATENT OFFICE.

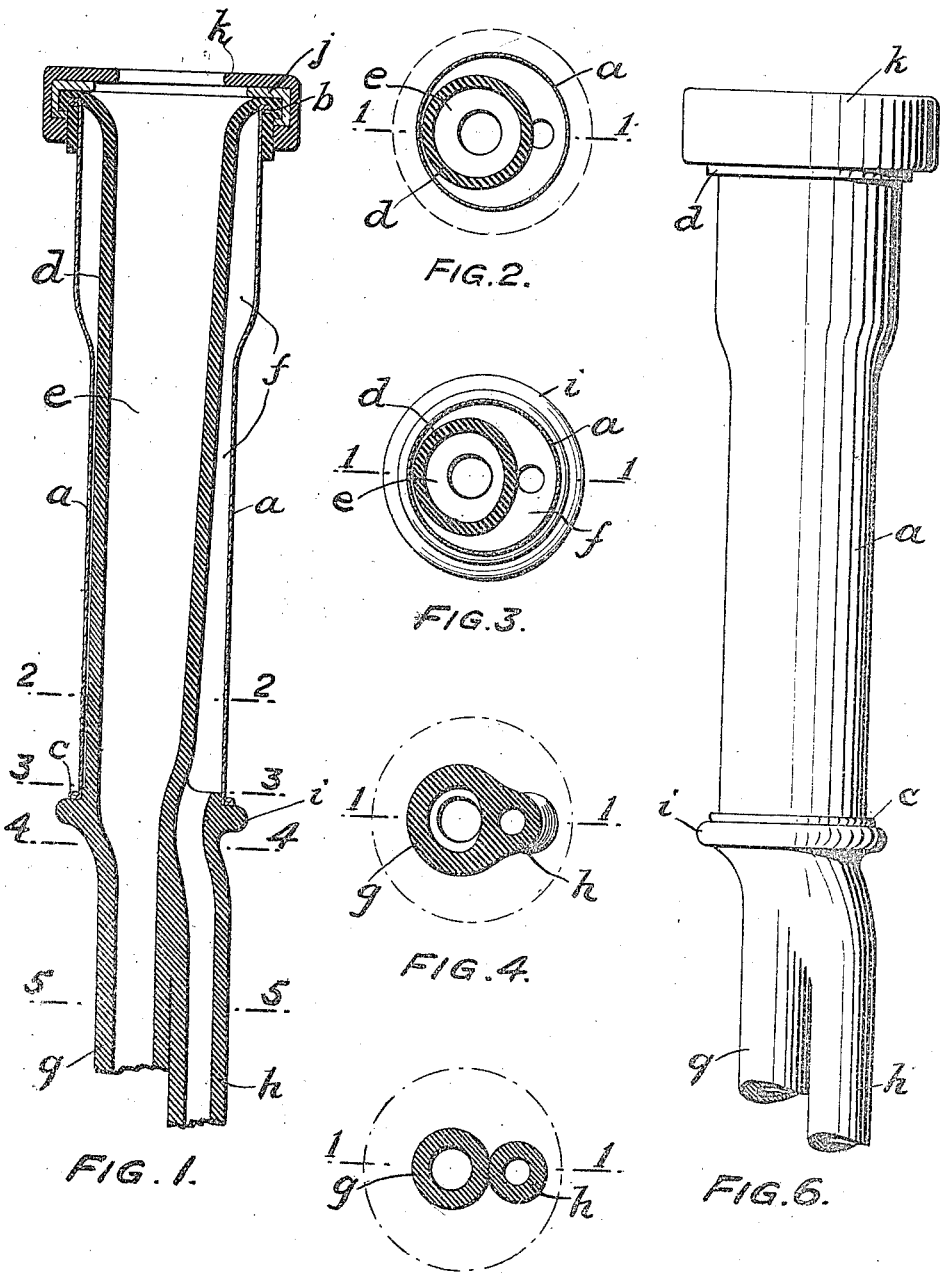

MEREDITH LEITCH, OF POUGHKEEPSIE, NEW YORK, ASSIGNOR TO THE DE LAVAL SEPARATOR COMPANY, A CORPORATION OF NEW JERSEY.

TEAT-CUP FOR MILKING-MACHINES.

1,249,134.

Specification of Letters Patent.

Patented Dec. 4, 1917.

Application filed October 10, 1916. Serial No. 124,751.

*To all whom it may concern:*

Be it known that I, MEREDITH LEITCH, a citizen of the United States, residing at Poughkeepsie, county of Dutchess, and State of New York, have invented a new and useful Improvement in Teat-Cups for Milking-Machines, of which the following is a full, clear, and exact description, reference being had to the accompanying drawings, which form a part of this specification.

My invention relates to that type of milking machine teat cup which has a central chamber to receive the teat and an annular chamber to receive pneumatic pressure for manipulation of the teat.

The object of my invention is to provide a teat cup which is simple in construction and operation, easy to clean and at the same time durable in use.

I will now describe in detail a preferred form of teat cup embodying my invention, in connection with the accompanying drawings in which—

Figure 1 is a vertical section through the center of the teat cup on the lines 1—1 of the other figures.

Fig. 2 is a cross sectional view on the line 2—2 of Fig. 1.

Fig. 3 is a cross sectional view on the line 3—3 of Fig. 1.

Fig. 4 is a cross sectional view on the line 4—4 of Fig. 1.

Fig. 5 is a cross sectional view on the line 5—5 of Fig. 1.

Fig. 6 is a side view of the complete teat cup.

The rigid outer shell $a$ is preferably made of metal, but may be made of hard rubber, celluloid, or other suitable material. The outer shell is circular in cross section at all points, and is provided with a bead $b$ around the top and bead or flange $c$ around the bottom.

The liner or flexible partition $d$ between the teat chamber $e$ and the annular pulsation chamber $f$ is made of rubber or other suitable material, and has formed integral with it a milk tube $g$ communicating with the teat chamber $e$ and the pulsation tube $h$ communicating with the pulsation chamber $f$.

On the liner $d$ is formed a flange $i$, near the junction of the two tubes $g$ and $h$, adapted to be drawn against the flange $c$ around the lower edge of the shell $a$. The upper end of the liner $d$ is adapted to be stretched out and turned back over the upper end of the shell and the flange $b$, where it is secured by a snap ring $j$. A separate flexible mouth piece $k$ is provided at the upper end of the shell.

My teat cup may be used in connection with any of several forms of claws, as, for example, that shown in my Patent No. 1,195,998 issued August 29, 1916.

In operation four similar cups are ordinarily used. The several milk tubes $g$ are attached to the stumps or branches from the milk chamber of the claw and the several pulsation tubes $h$ are attached to the stumps or branches from a chamber in communication with a source of pneumatic pulsations. The claw is not shown, as its specific construction forms no part of my invention.

My improved teat cup may be easily manufactured and assembled. The smooth circular shell is of a shape easily formed by drawing from sheet metal. It is also very easily cleaned. The rubber liner is easily formed in a mold. It may be readily seen that, with the mouth piece $k$ removed, all surfaces with which the milk comes in contact are accessible for washing and inspection without disassembling the cup. Because the pulsation tube is attached at the lowest point of the annular chamber $f$, it will draw off, during the first few minutes of use, any water that may have accidentally reached that chamber during the washing of the cups.

Having now fully described my invention, what I desire to claim and protect by Letters Patent is:—

1. A flexible liner for milking machine teat cups comprising a teat receiving tube and separate milk and pulsation tubes formed integrally with the teat receiving tube.

2. A flexible hollow liner for milking machine teat cups provided with an integral extension having two tubes one of which, the milk tube, communicates with the interior of the liner proper and the other of which, the pulsation tube, opens outside that part of the wall of the liner proper adjacent to the entrance to the milk tube.

3. A teat cup comprising a rigid outer shell, a flexible liner, and a milk tube and a pulsation tube both formed integrally with the liner.

4. A teat cup comprising a rigid outer shell of circular cross section, a flexible liner, and a milk tube and a pulsation tube both formed integrally with the liner.

5. A teat cup comprising a rigid outer shell, a flexible liner, and a milk tube and a pulsation tube both formed integral with the liner, said pulsation tube opening into the lower end of the annular space between the shell and the liner.

6. A teat cup comprising a rigid outer shell, a flexible liner within the shell and provided with an integral extension having two tubes, one of which communicates with the interior of the liner proper and the other of which communicates with the lower end of the annular space between the shell and the liner.

7. A teat cup comprising a rigid outer shell, a flexible liner within the shell and provided with an integral extension having two tubes, one of which communicates with the interior of the liner proper and the other of which communicates with the lower end of the annular space between the shell and the liner and a flange integral with said extension and surrounding the same below the upper end of the second tube and forming an abutment receiving the lower end of the outer shell.

In testimony of which invention, I have hereunto set my hand, at Poughkeepsie, N. Y., on this 27th day of Sept., 1916.

MEREDITH LEITCH.